United States Patent
Smith et al.

(10) Patent No.: US 9,206,941 B2
(45) Date of Patent: Dec. 8, 2015

(54) APPARATUS AND METHOD FOR CLAMPING

(75) Inventors: Cade Smith, Mesa, AZ (US); Jay Lopeman, Queen Creek, AZ (US)

(73) Assignee: Triclawps LLC, Chandler, AZ (US)

( * ) Notice: Subject to any disclaimer, the term of this patent is extended or adjusted under 35 U.S.C. 154(b) by 1310 days.

(21) Appl. No.: 12/259,282

(22) Filed: Oct. 27, 2008

(65) Prior Publication Data

US 2010/0102178 A1    Apr. 29, 2010

(51) Int. Cl.
| | | |
|---|---|---|
| A47F 5/00 | (2006.01) | |
| F16M 11/04 | (2006.01) | |
| F16M 11/08 | (2006.01) | |
| F16M 11/32 | (2006.01) | |
| F16M 13/00 | (2006.01) | |
| F41A 23/14 | (2006.01) | |

(52) U.S. Cl.
CPC .............. *F16M 11/04* (2013.01); *F16M 11/08* (2013.01); *F16M 11/32* (2013.01); *F16M 13/00* (2013.01); *F41A 23/14* (2013.01); *F16M 2200/02* (2013.01)

(58) Field of Classification Search
CPC ....... F16M 11/04; F16M 11/08; F16M 11/32; F16M 13/00; F16M 2200/02; F41A 23/14
USPC .............. 248/229.12, 228.3, 230.31, 231.41, 248/316.4, 122.1, 126, 346.05, 346.07, 248/229.14, 229.24, 228.5, 177.1, 309.1, 248/178.1, 250, 316.6, 231.61, 316.1, 248/176.1; 24/569, 525, 514, 486; 224/558, 224/570; 211/43, 184, 175; 73/167; 42/94; 89/37.04
See application file for complete search history.

(56) References Cited

U.S. PATENT DOCUMENTS

| | | | | |
|---|---|---|---|---|
| 7,326 | A * | 4/1850 | Peck | 396/438 |
| 971,438 | A * | 9/1910 | Gillitt | 248/227.4 |
| 2,427,365 | A * | 9/1947 | Meister | 269/152 |
| 2,870,683 | A * | 1/1959 | Wilson | 89/40.06 |
| 2,880,490 | A * | 4/1959 | Rizzatti et al. | 396/419 |
| 3,006,052 | A * | 10/1961 | Stickney et al. | 248/187.1 |
| 3,016,802 | A * | 1/1962 | Grunenberg | 89/40.06 |
| 3,218,058 | A * | 11/1965 | Smith | 269/166 |
| 3,800,312 | A | 3/1974 | Brandt | |
| 4,017,997 | A * | 4/1977 | Peterson et al. | 42/94 |
| 4,033,276 | A * | 7/1977 | Barr | 114/190 |
| 4,057,816 | A | 11/1977 | Killian, Jr. et al. | |
| 4,265,045 | A * | 5/1981 | Garbini | 42/94 |
| 4,697,775 | A * | 10/1987 | Wille | 248/231.41 |
| 4,841,839 | A * | 6/1989 | Stuart | 89/37.04 |
| 5,081,782 | A * | 1/1992 | Wright | 42/94 |
| 5,112,015 | A * | 5/1992 | Williams | 248/236 |

(Continued)

*Primary Examiner* — Kimberly Wood
(74) *Attorney, Agent, or Firm* — Hartman Titus PLC; John D. Titus

(57) ABSTRACT

The preferred embodiments of the present invention provide an apparatus structured and arranged to securely clamp an object to a support structure. The most preferred embodiments of the present invention comprise a clamping apparatus configured to secure a long rifle or other firearm to a tripod, using a standard camera mounting bracket. In this embodiment, the clamping apparatus comprises a base with a pair of substantially L-shaped interlocking brackets and a pair of spring-loaded cam locking mechanisms used to fix the L-shaped brackets in position. Additional preferred embodiments of the present invention comprise rubber pads or other protective material affixed to the surface of the clamping apparatus to minimize damage to the object being clamped. A method of using the clamping apparatus is also disclosed.

7 Claims, 6 Drawing Sheets

(56) References Cited

U.S. PATENT DOCUMENTS

| | | | |
|---|---|---|---|
| 5,347,740 A | 9/1994 | Rather et al. | |
| 5,370,570 A * | 12/1994 | Harris | 446/227 |
| 5,375,337 A * | 12/1994 | Butler | 33/506 |
| 5,491,919 A | 2/1996 | Rather et al. | |
| 5,667,178 A * | 9/1997 | Yang | 248/262 |
| 5,697,601 A * | 12/1997 | Gurule | 269/43 |
| 5,769,292 A * | 6/1998 | Cucheran et al. | 224/324 |
| 5,833,180 A * | 11/1998 | Baranowski | 248/118 |
| 6,123,306 A | 9/2000 | Jackson | |
| 6,272,785 B1 * | 8/2001 | Mika et al. | 42/94 |
| 6,286,797 B1 * | 9/2001 | Thaxton | 248/229.14 |
| 6,370,741 B1 * | 4/2002 | Lu | 24/523 |
| 6,375,140 B1 * | 4/2002 | Shen | 248/251 |
| 6,574,899 B1 * | 6/2003 | Mostello | 42/94 |
| 6,773,172 B1 * | 8/2004 | Johnson et al. | 396/428 |
| 6,935,065 B1 | 8/2005 | Oliver | |
| 6,991,384 B1 | 1/2006 | Davis | |
| 7,077,582 B2 * | 7/2006 | Johnson | 396/428 |
| 7,121,034 B2 | 10/2006 | Keng | |
| 7,163,181 B2 | 1/2007 | Omps | |
| 7,175,143 B1 * | 2/2007 | Ho | 248/215 |
| 7,222,451 B2 | 5/2007 | Keng et al. | |
| 7,356,960 B1 | 4/2008 | Knitt | |
| D631,525 S * | 1/2011 | Smith et al. | 42/94 |
| 2003/0140543 A1 | 7/2003 | Yeargin | |
| 2005/0077437 A1 * | 4/2005 | Widlacki | 248/70 |
| 2007/0157502 A1 | 7/2007 | Holmberg | |
| 2008/0156948 A1 | 7/2008 | Cameron et al. | |
| 2008/0163532 A1 | 7/2008 | Moody et al. | |

* cited by examiner

APPARATUS AND METHOD FOR CLAMPING

BACKGROUND OF THE INVENTION

1. Technical Field

The present invention relates generally to the field of clamps and more specifically relates to an apparatus for clamping or fixing objects in position using one or more support structures such as a camera tripod.

2. Background Art

Hunting is a popular sport in many countries, including the United States. The thrill and adventure of hunting, set against the scenic backdrop of the great outdoors, proves irresistible for many. In order to have a successful hunt, a hunter will need to be well equipped for the hunting trip. Depending on the length and type of hunting trip, a typical hunter will typically prepare and carry firearms, ammunition, food, water, clothing, etc. These are generally considered to be the minimum requirements for a successful hunting trip.

In addition to the basic essential items needed for the hunt, many hunters have found that certain types of optional equipment can make the hunt more enjoyable and more successful. Some hunters may travel with tents and sleeping bags, cots and pillows, among other items. Other hunters may include additional equipment such as a support stand for their long rifle, to provide more stability for the long distance shots that many hunting scenarios require. Further, many hunters will choose to carry GPS devices, cell phones, binoculars, monoculars, scopes, and various other optics for spotting and locating game in the field. In addition, given the beauty of the environment, many hunters also like to carry a still or video camera to document their trip and, hopefully, their success on the hunt. Many of these items may also require the use of a tripod to assist the hunter when using the device, including, for example, a tripod for securely positioning a camera or an optical scope. Additionally, many of the support stands or tripods for these optional devices are not well adapted for other types of equipment due to the size and/or weight of the device.

Since many of these devices have their own dedicated support apparatus, a hunter could end up carrying a significant amount of extra gear. For example, if a hunter will be backpacking through a dense forest for an extended period of time or over a considerable distance, it may be necessary to sacrifice certain items that would otherwise be included in the inventory, simply because the size and/or weight of the object outweighs its probable value to the hunter. In fact, given the extra weight and space associated with the decision to include these optional items in the inventory, it may be necessary to leave some otherwise desirable equipment behind. This may force a hunter to make choices based on a rationale other than what would be best for the hunt.

Accordingly, there exists a need for additional types of equipment that the average hunter can use to reduce the need to carry special purpose devices on a hunt. It would be desirable to have one or more multi-purpose devices that could be deployed in a variety of situations and used in conjunction with more than one piece of equipment. Without additional improvements in the type and flexibility of equipment available to hunters, the overall hunting experience will continue to be sub-optimal.

BRIEF SUMMARY OF THE INVENTION

The preferred embodiments of the present invention provide an apparatus structured and arranged to securely clamp an object to a support structure. The most preferred embodiments of the present invention comprise a clamping apparatus configured to secure a long rifle or other firearm to a tripod, using a standard camera mounting bracket. In this embodiment, the clamping apparatus comprises a base with a pair of substantially L-shaped interlocking brackets and a pair of spring-loaded cam locking mechanisms used to fix the L-shaped brackets in position. Additional preferred embodiments of the present invention comprise rubber pads or other protective material affixed to the surface of the clamping apparatus to minimize damage to the object being clamped. A method of using the clamping apparatus is also disclosed.

BRIEF DESCRIPTION OF THE DRAWINGS

The preferred embodiments of the present invention will hereinafter be described in conjunction with the appended drawings, wherein like designations denote like elements and.

DETAILED DESCRIPTION

Figure 1:
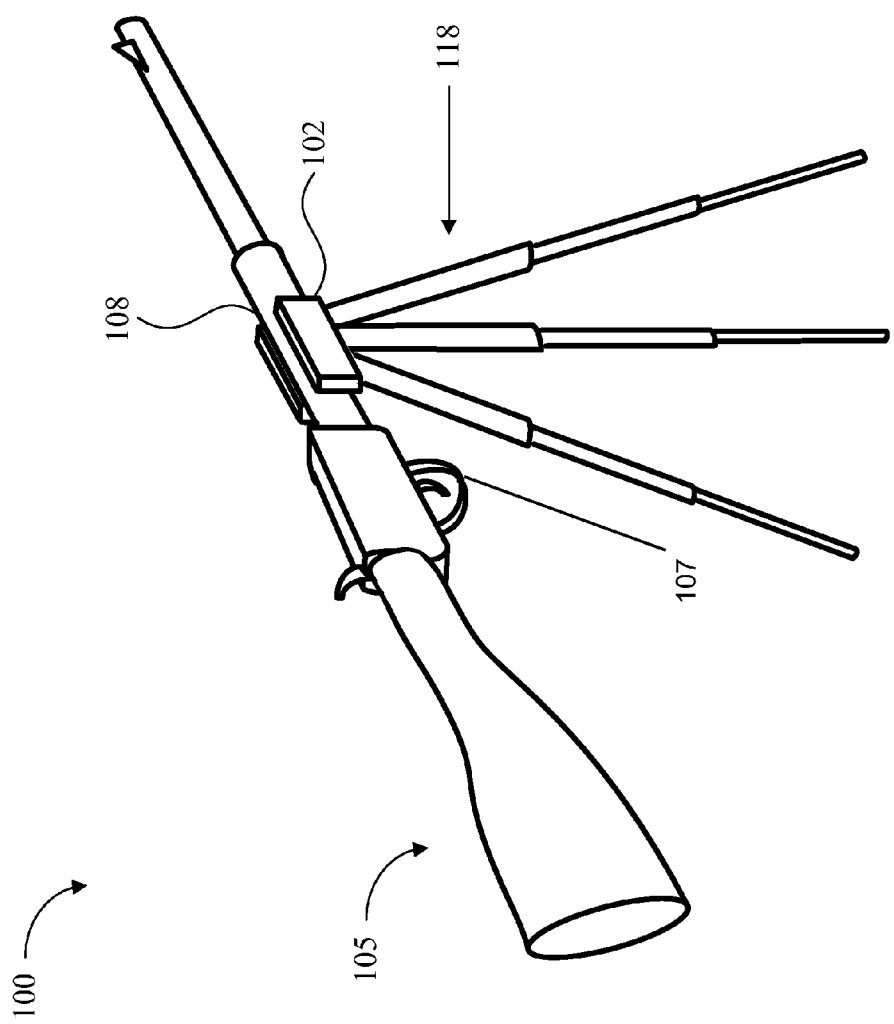
FIG. 1 shows a perspective view of a clamping system in accordance with a preferred embodiment of the present invention.

Referring now to FIG. 1, a perspective view of a clamping system 100 in accordance with a preferred embodiment of the present invention is depicted. Clamping system 100 most preferably comprises at least one spring-loaded clamping mechanism 102 deployed in combination with at least support structure such as tripod 118. In the most preferred embodiments of the present invention, clamping mechanism 102 is configured to be selectively and removably attached to at least one object, such as firearm 105. As shown in FIG. 1, clamping mechanism 102 may be removably attached to stock 108 of firearm 105, which is forward of trigger guard 107 thereby providing a support structure for firearm 105. While shown as a long rifle in FIG. 1, those skilled in the art will recognize that firearm 105 may be any of a rifle, a shotgun, a muzzleloader, or a handgun, any of which may be mounted in clamping mechanism 102 of clamping system 100.

In the most preferred embodiments of the present invention, tripod 118 is a standard universal camera-style tripod with a standard quick-release head mount that accepts a standard camera mounting plate. Clamping mechanism 102 will be configured with a standard mounting plate affixed to the bottom of clamping mechanism 102. In this fashion, firearm 105 may be quickly and easily attached to and detached from tripod 118.

Those skilled in the art will recognize that other types of support structures, such as bench mounts and the like, and other portable support structures such as monopods and bipods, may also be suitably employed and the various embodiments of the present invention are not limited to the use of any specific support structure. However, in the most preferred embodiments of the present invention, clamping system 100 permits a user to use a standard camera tripod 118 for selectively and alternatively holding either firearm 105 or camera or other objects such as scopes, binoculars and other long range optics, preferably separately or alternately preferably in combination with each other.

In the most preferred embodiments of the present invention, clamping apparatus 102 and a camera will each be provided with their respective standard camera mounting plate, thereby providing the user the ability to quickly and easily switch between either mounting firearm 105 or mounting a camera using the same tripod 118. Those skilled in the art will readily recognize that clamping mechanism 102 may also be used to secure other objects to tripod 118 by providing a way to retrofit and attach a standard camera mounting plate to objects manufactured without any mechanism for securing the object to a tripod.

In addition to the benefit of rapid mounting and dismounting of firearm 105, clamping system 100 preferably aids handicapped and/or novice hunters that may not be able to maintain a firm grip on firearm 105. Certain hunters have difficulties handling firearms due to the loss of function in one or more limbs. The use of clamping system 100 will allow these hunters additional options for safe and controlled hunting experiences. The present invention also offers the option for the more experienced user to first locate the quarry and then lock the gun into position on the quarry and leave the "shot" for a less experienced user. Further, clamping system 100 may serve to substantially reduce recoil or "kick" that would normally be experienced by a user. This will help to alleviate the fear and uncertainty that some novice hunters may have.

Upon reading this specification, those with ordinary skill in the art will now appreciate that, under appropriate circumstances, considering such issues as design preference, user preferences, marketing preferences, cost, structural requirements, available materials, technological advances, etc., the present invention may be readily adapted for other clamping methods and objects. For example, the use of powered or unpowered clamps with various configurations may be used to clamp various other objects such as crossbows, binoculars, telescopes, movie cameras, etc. Additionally, clamping mechanism 102 may be further adapted to fit on alternate stands, alternate tripods, stands having more than three legs, tripods being used for other stabilization means or uses, etc. without departing from the spirit or scope of the present invention.

As shown in FIG. 1, clamping system 100 provides a substantially stable, consistent supporting means for firearm 105, thereby reducing fatigue in the user, assisting the user in maintaining a relatively sure grip, and allowing a true shot to be fired. In the most preferred embodiments of the present invention, tripod 118 is adjustable and adapted for use in many different terrains and environments. Further, tripod 118 is most preferably durable, lightweight and substantially compact. Tripod 118 may be selected based upon size and according to the best-fit for the terrain and hunting and/or shooting occasion. These and other features preferably allow the user to efficiently carry and deploy clamping system 100 in a wide variety of hunting situations, while also allowing for the use of a camera, hunting optics, etc. with a single tripod.

Figure 2:
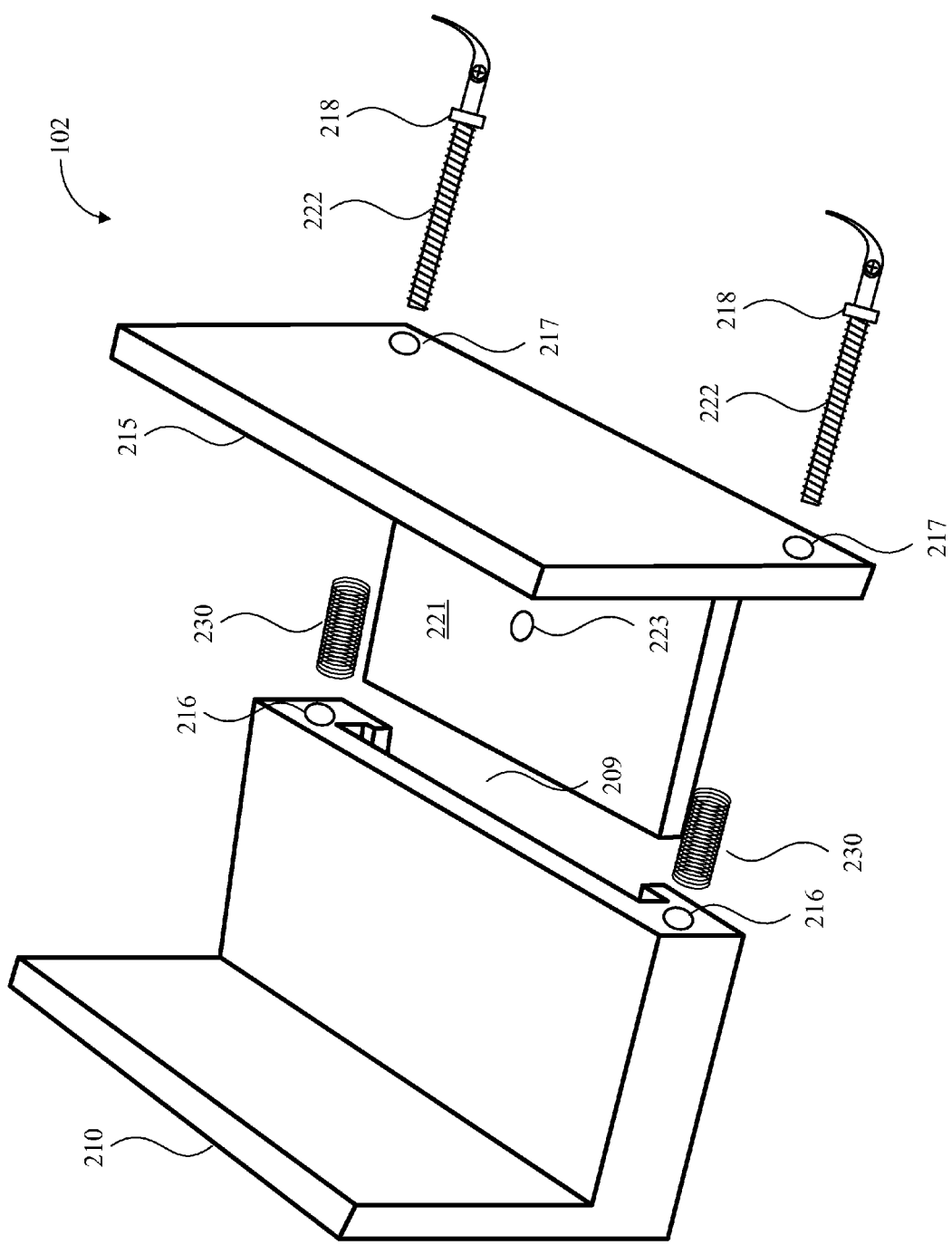
FIG. 2 shows an exploded perspective view of a clamping apparatus in accordance with a preferred embodiment of the present invention.

Referring now to FIG. 2 an exploded perspective view of clamping mechanism 102 of the clamping system 100 of FIG. 1 in accordance with a preferred embodiment of the present invention is depicted. In the most preferred embodiments of the present invention, clamping mechanism 102 comprises: a bracket 210; a bracket 215; a first threaded rod or connector 222; a second threaded rod or connector 222; a first spring 230; and a second spring 230. Bracket 215 comprises a first aperture 217 and a second aperture 217. Bracket 210 further comprises a first threaded aperture 216 and a second threaded aperture 216.

Apertures 217 are most preferably sized to allow threaded connectors 222 to pass through without any significant binding. In other words, the outer diameter of threaded connectors 222 is at least somewhat smaller than the inside diameter of apertures 217. This relationship allows threaded connectors 222 to pass through apertures 217 for assembly of clamping apparatus 102.

Threaded apertures 216 are matchingly threaded to the thread count of threaded connectors 222 so as to receive threaded connectors 222 during the assembly of clamping apparatus 102. Prior to inserting threaded connectors 222 into the respective threaded apertures 216, but after the threaded portion of threaded connectors 222 are passed through apertures 217, springs 230 are placed over the threaded portion of threaded connectors 222.

In the most preferred embodiments of the present invention, Bracket 210 and Bracket 215 are manufactured from a non-ferrous material, such as aluminum or aluminum alloy. However, upon reading this specification, those with ordinary skill in the art will now appreciate that under appropriate circumstances, considering such issues as design preference, user preferences, marketing preferences, cost, structural requirements, available materials, technological advances, etc., other materials such as various suitable alloy combinations of ferrous or non-ferrous metals, plastics, ceramics, composites, etc., may be suitable for manufacturing bracket 210 and bracket 215. Additionally, although bracket 210 and bracket 215 are shown as substantially L-shaped brackets, those skilled in the art will recognize that other shapes may be suitably employed.

Brackets 210 and 215 preferably comprise a tongue portion 221 and groove portion 209 that are sized so as to allow bracket 210 and bracket 215 to be slideably engaged and thereby cooperate to form a stable base for clamping apparatus 102. Bracket 210 and bracket 215 are held together by inserting threaded connectors 222 into threaded apertures 216 and turning threaded connectors as is typical for joining threaded components.

Springs 230, being positioned over the threads of threaded connectors 222 and further being position and compressed between bracket 210 and bracket 215 as the threaded body portions of threaded connectors 222 are inserted into place and screwed into position, create a spring tension and urge bracket 210 and bracket 215 apart and away from each other. This spring tension serves to reduce any undesirable "chattering" that may occur if the various components of clamping apparatus 102 were unrestrained by springs 230. In a hunting situation, any unnatural and unusual noise is undesirable since it may serve to alert and frighten the quarry. By including springs 230 in the design of clamping apparatus 102, these undesirable metallic noises can be reduced or eliminated. In addition, the spring tension provided by springs 230 further serve to fix brackets 210 and 215 into position, allowing for rapid removal and re-insertion of firearm 105 into clamping apparatus 102.

Bushings or washers 218 are positioned over the shaft of threaded connectors 222. In the most preferred embodiments of the present invention, bushings or washers 218 are manufactured from nylon or other suitable durable and protective material.

Threaded aperture 223 is most preferably positioned in the central area of tongue portion 221 of bracket 215 and is sized so as to accommodate a standard screw fitting such as is common with standard mounting plates found in use to mount cameras to camera tripods. This configuration allows a standard camera mounting bracket to be inserted into threaded aperture 223 and, thereby, allows clamping apparatus 102 to be attached or affixed to any standard tripod employing the appropriate threaded aperture. While this is the most preferred embodiment of the present invention, those skilled in the art will recognize that other mounting techniques and devices may be suitably employed.

Figure 3:
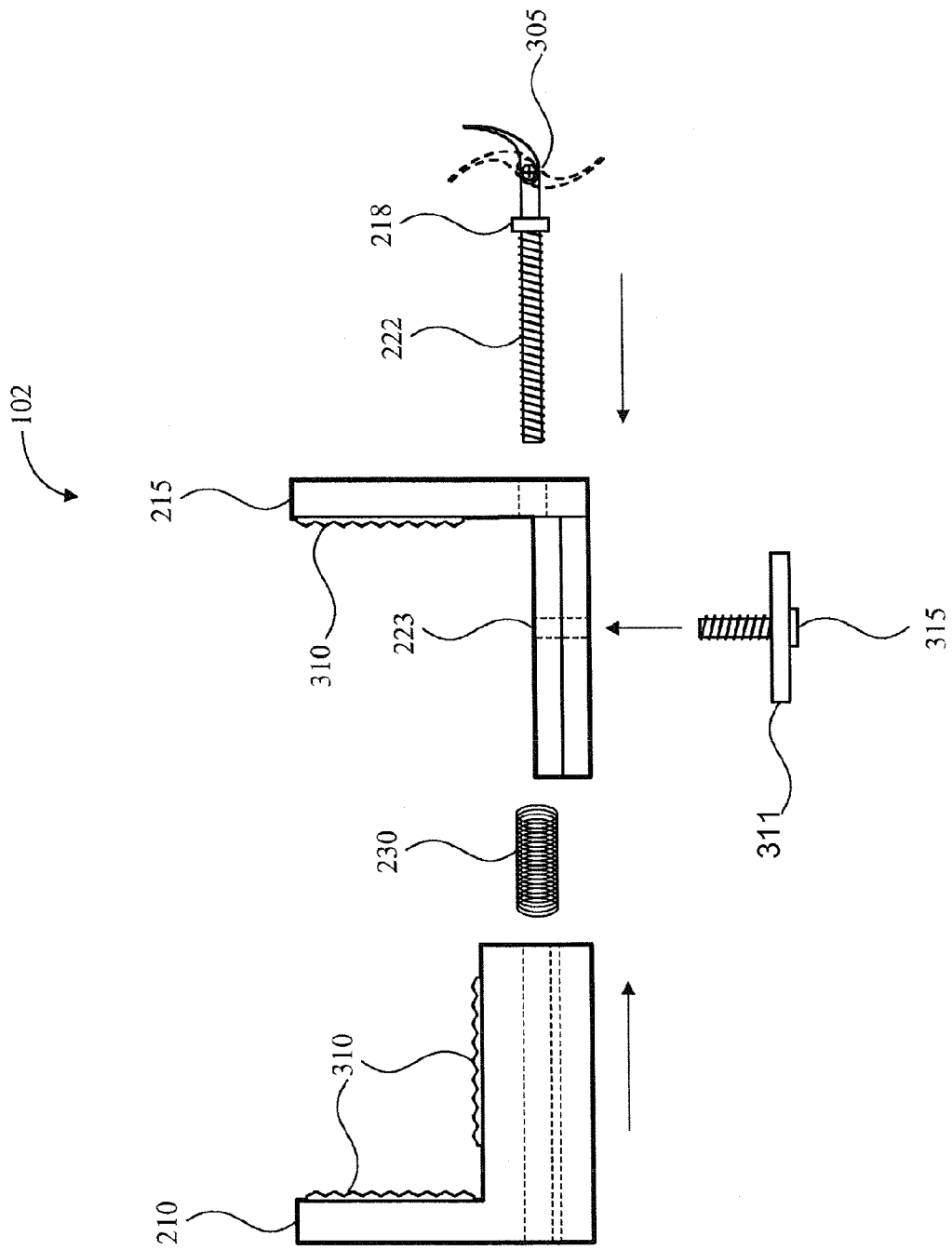
FIG. 3 shows an exploded end view of a clamping apparatus in accordance with a preferred embodiment of the present invention.

Referring now to FIG. 3, an end exploded view of a clamping apparatus in accordance with a preferred embodiment of the present invention is depicted. As shown in FIG. 3, certain preferred embodiments of the present invention will further comprise a protective padding or cushioning material 310 applied to the inner surface of bracket 210 and bracket 215. Protective padding or cushioning material 310 is provided for several purposes. First, it can serve to protect the surface finish of the object being clamped in clamping apparatus 102. Additionally, in the most preferred embodiments of the present invention, protective padding or cushioning material 310 can serve as a sponge-like cushioning agent to absorb impacts and to distribute the force of impact over a larger surface. Additionally, the resilient nature of the material serves to help the surface of protective padding or cushioning material 310 conform to the shape of the object being clamped into clamping apparatus 102. This provides for a better "grip" on the object and allows the object to be more securely held in position. Protective padding or cushioning material 310 is most preferably made from a rubber-like or silicone-like material and may be affixed to backets 210 and 215 by any suitable means known to those skilled in the art.

In addition, FIG. 3 illustrates the use of a bolt 315 to attach or affix a mounting plate 311 to the bottom of clamping apparatus 102. FIG. 3 also illustrates the pivoting cam-locking head 305 of threaded connector 222. As shown in FIG. 3, cam-locking head 305 is pivotably attached to a headless bolt at the end of threaded connector 222. This allows cam-locking head 305 to pivot and "lock" into position when pressed towards the body of bracket 215. Cam-locking heads 305 are actuated by turning cam-locking heads to a neutral position and rotating cam-locking heads clockwise or counter-clockwise, to urge brackets 210 and 215 towards each other or to allow springs 230 to force brackets 210 and 215 away from each other.

The combination of the spring tension exerted by springs 230 and the cam-locking nature of cam-locking head 305 provides a secure way to lock threaded connectors 222 into position. Those skilled in the art will recognize that other types of locking devices could be employed but the most preferred embodiments of the present invention will employ a cam-locking head 305. A traditional screw end or knurled knob, while sufficient, may have a tendency to gradually "unscrew" itself from threaded apertures 216 during transportation or if subjected to jarring motions. That would be undesirable for most hunting and other applications.

Figure 4:
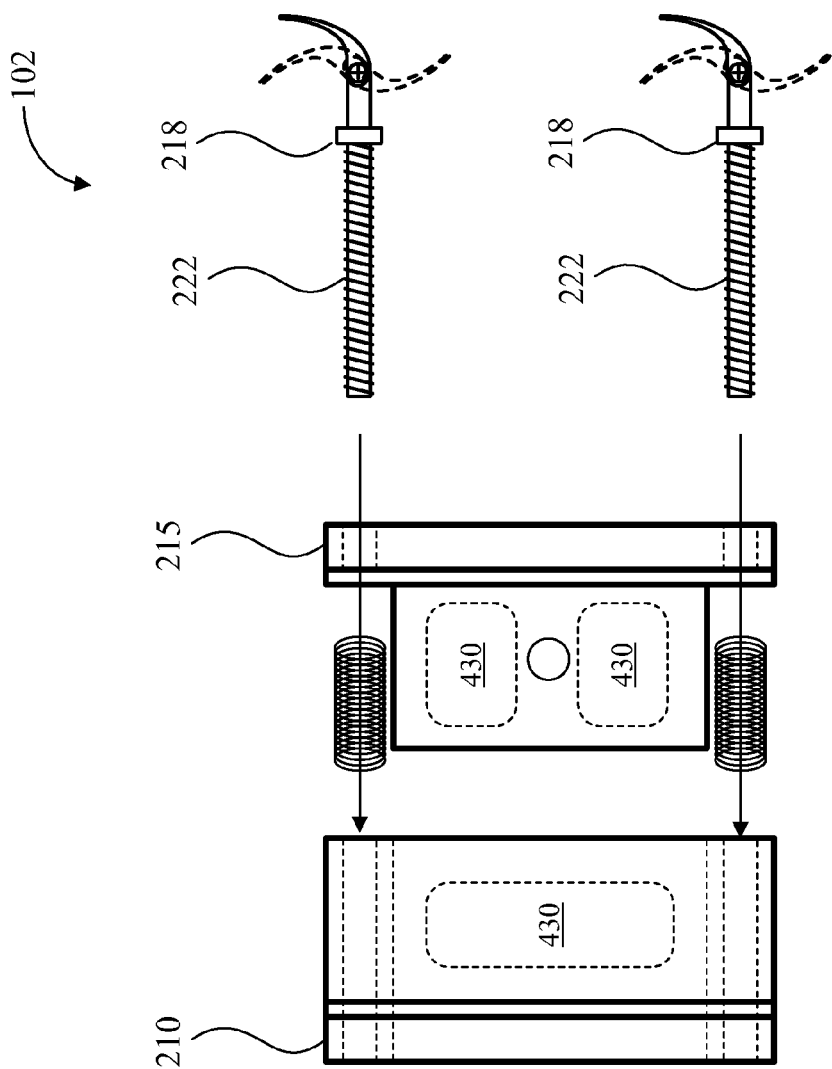
FIG. 4 shows an exploded top view of a clamping apparatus in accordance with a preferred embodiment of the present invention.

Referring now to FIG. 4, a top exploded view of a clamping apparatus in accordance with a preferred embodiment of the present invention is depicted. As shown in FIG. 4, carve-outs 430 may be optionally installed into the body portion of brackets 210 and 215. Carve-outs 430 represent the removal of some material from the body of brackets 210 and 215. This may be a removal completely through the body of brackets 210 and 215 to form apertures or a partial removal of material to create pockets or indentations. In either case, the removal of material to form carve-outs 430 will serve to reduce the weight of clamping apparatus 102. Additionally, the pockets or indentations will provide a recessed area suitable for branding with trademarks, logos, or other indicia.

Figure 5:
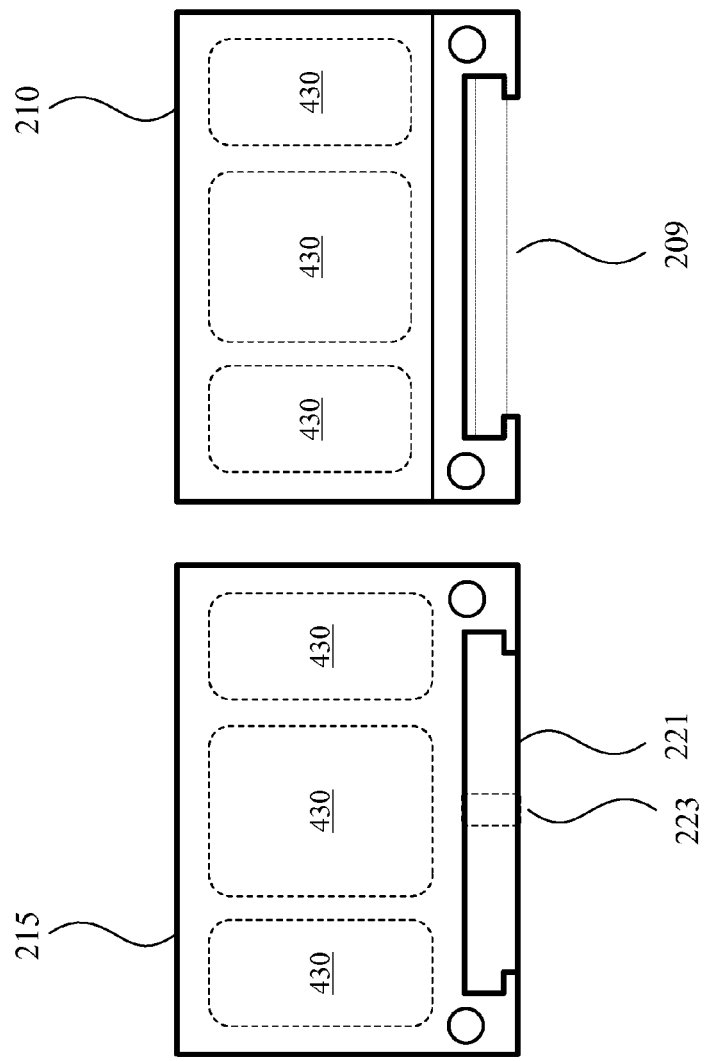
FIG. 5 shows an side view of the two plates for a clamping apparatus in accordance with a preferred embodiment of the present invention.

Referring now to FIG. 5, a side view of bracket 210 and bracket 215 is depicted. FIG. 5 presents a more detailed view of the tongue and groove relationship of slot or grooved portion 209 in bracket 210 and the corresponding tongue portion 221 that is formed in bracket 215. Additionally, FIG. 5 illustrates that carve-outs 430 may be formed in the vertical portions of brackets 210 and 215 as well as the horizontal portions.

Figure 6:
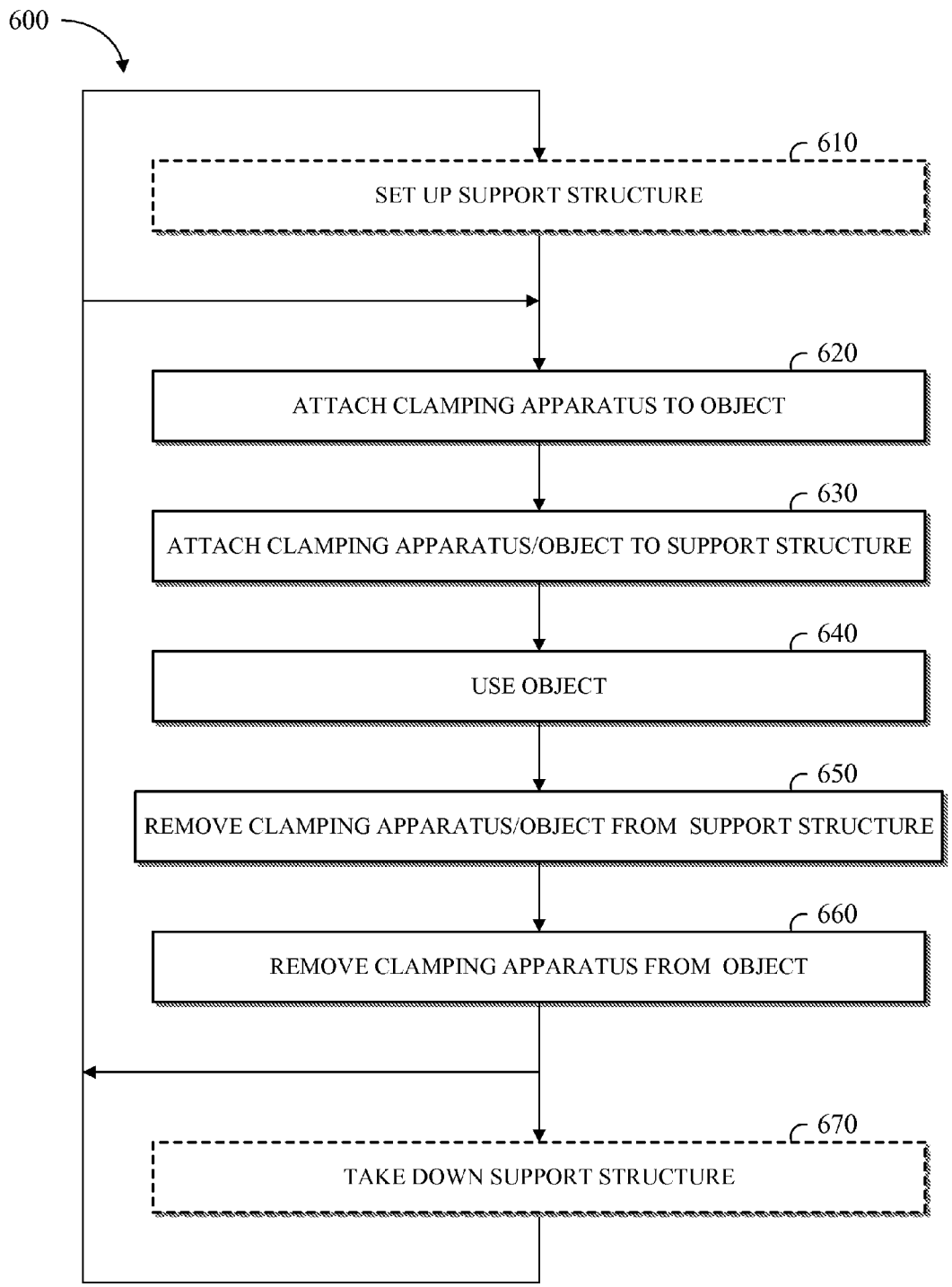
FIG. 6 is a flowchart illustrating a preferred method of use for a clamping apparatus in accordance with a preferred embodiment of the present invention.

Referring now to FIG. 6 shows a flowchart illustrating a method 600 for operating or using a clamping apparatus in accordance with a preferred embodiment of the present invention is depicted.

As shown in FIG. 6, a support structure for use in conjunction with a clamping apparatus is set up or deployed (step 610). In the most preferred embodiments of the present invention, the support structure is a standard camera-style tripod.

Next, a clamping apparatus is attached or affixed to an object (step 620). In the most preferred embodiments of the present invention, the object will be a firearm, and more particularly, a long gun such as a hunting rifle. The preferred operation for this step will involve placing the object into the clamping apparatus and actuating the threaded connectors by screwing them into position until the object is tightly clamped. Then, the cam-lock heads can be rotated towards the brackets, thereby firmly locking the object in place.

Next, the clamping apparatus, with the object firmly clamped into position, will be attached or affixed to the support structure (step 630). In the most preferred embodiments of the present invention, this step will comprise the step of connecting the clamping apparatus to the head of the camera tripod by coupling the standard mounting plate on the bottom of the clamping apparatus to the head of the camera tripod using the standard mounting bracket located on the head of the camera tripod.

Next, the user will manipulate or use the object while it is attached to the support structure (step 640). In the most preferred embodiments of the presenting invention, this step will comprise the steps of aiming and firing the long gun. In the application where the support structure is a standard camera tripod, the user may actuate the tilt, pan, swivel, and rotate features of the head of the camera tripod to more correctly position the long gun in the appropriate direction.

Next, the user will remove the clamping apparatus from the support structure (step 650). For the most preferred embodiments of the present invention, this step entails the removal of the clamping apparatus from the camera tripod by disengaging the standard mounting plate that is affixed to the bottom of the clamping apparatus from the standard mounting connector on the head of the camera tripod.

Next, the user will remove the clamping apparatus from the object (step 660). In the most preferred embodiments of the present invention, this step is a simple reversal of the steps used to attach the clamping apparatus to the object. In this case, releasing the cam-lock heads of the threaded connectors and unscrewing them to the degree necessary to release the object from the brackets. Those skilled in the art will recognize that, depending on the circumstances, it may also be desirable to leave the clamping apparatus attached to the object, thereby allowing for rapid redeployment of the object. This may be especially useful in situations where multiple objects are being alternatively removed and affixed to the support structure, with each object having its own mounting plate (e.g., camera or optical scope and a long gun).

Finally, the user will take down or disassemble the support structure (step 670). Obviously, this option step need not be followed in all circumstances. Additionally, as shown in FIG. 6, the user may choose instead to return to step 620 and attach a different object to the support structure.

It should be noted that the steps presented in conjunction with FIG. 6 are not necessarily accomplished in the order presented. For example, it would be possible to affix or attach the clamping mechanism to the support structure prior to attaching the object to the clamping apparatus (e.g., performing step 630 prior to step 620). However, that sequence of events may make it more difficult to attach the object to the clamping apparatus to the object. Similarly, it would be possible to remove the object from the clamping apparatus prior to removing the clamping apparatus from the support structure but that sequence of events may also be less efficient (e.g., performing step 660 prior to step 650). Hence, the order of steps presented in FIG. 6 is the most preferred embodiment for method 600 but is not exclusive.

In addition to providing the clamping apparatus of the present invention as a stand-alone product, it is envisioned that one or more preferred embodiments of the present invention will comprise a clamping apparatus, a tripod, a mounting plate, and an instruction booklet being packaged and/or provided together as a single unit or kit.

From the foregoing description, it should be appreciated that a preferred embodiment clamping of a clamping system 100 and a method of use for clamping system 100 are provided and present significant benefits that would be apparent to one skilled in the art. Furthermore, it should be appreciated that a vast number of variations in the embodiments exist. Lastly, it should be appreciated that these embodiments are preferred exemplary embodiments only, and are not intended to limit the scope, applicability, or configuration of the invention in any way. Rather, the foregoing detailed description provides those skilled in the art with a convenient framework for implementing a preferred exemplary embodiment of the invention, it being understood that various changes may be made in the function and arrangement of elements described in the exemplary preferred embodiment without departing from the spirit and scope of the invention as set forth in the appended claims.

The invention claimed is:

1. Apparatus for releasably attaching a firearm to a camera stand having a standard camera tripod mount, the firearm having a barrel and longitudinal axis parallel to the barrel, the apparatus comprising:
a single U-shaped clamp having a width and a depth sufficient to rigidly clamp the firearm along the sides thereof at a single location along the length of the firearm, said U-shaped clamp comprising;
(a) a first jaw member comprising a bracket having a substantially L-shaped profile when viewed along an axis parallel to the longitudinal axis of the firearm, the first jaw member having a bottom portion and a side portion;
(b) a second jaw member comprising a bracket having a substantially L-shaped profile when viewed along an axis parallel to the longitudinal axis of the firearm, the second jaw member having a bottom portion and a side portion, the side portions of the first and second jaw members forming substantially vertical side walls disposed in a spaced apart configuration defining a gap therebetween, the bottom portion of the second jaw member including a protruding portion that slidingly engages a corresponding opening formed in the bottom portion of the first jaw member, the protruding portion and corresponding opening cooperating to maintain the side portions of the first and second jaw members in a substantially parallel orientation while enabling the gap between the side portions of the first and second jaw members to be increased and decreased;
(c) the bottom portion of one of the first jaw member and the second jaw member comprising a threaded aperture for attaching the first and second jaw members to the standard camera tripod mount, the aperture being positioned so that the standard camera tripod mount is attached at a position located between the first and second jaw members; and
(d) an adjustable fastener holding the side portions of the first and second jaw members together, the adjustable fastener including a handle capable of being manipulated by one hand of a user to tighten the first and second jaw members for securing the firearm between the first and second jaw members.

2. The apparatus of claim 1, wherein the side portions of the first and second jaw members each define an inward-facing surface and wherein the first and second jaw members further comprise a cushioning layer on the inward-facing surface of each of the first and second jaw members.

3. The apparatus of claim 1, further comprising:
a resilient member urging the side portions of the first and second jaw members apart to automatically open the U-shaped clamp to release the firearm when the adjustable fastener is loosened.

4. The apparatus of claim 1, wherein:
the adjustable fastener comprises a threaded fastener coupled to a cam member.

5. The apparatus of claim 1, wherein:
the adjustable fastener comprises a headless screw with a threaded body portion and a cam-locking head pivotably attached to the headless screw, the threaded body portion engaging corresponding threads in the first jaw member and the cam-locking head having a cam surface bearing on a bearing surface of the second jaw member.

6. The apparatus of claim 3, further comprising:
a second adjustable fastener holding the side portions of the first and second jaw members together; and
a second resilient member urging the side portions of the first and second jaw members apart.

7. The apparatus of claim 1, further comprising:
a camera mounting plate for a quick-release head mount attached the bottom portion of one of the first jaw member and the second jaw member.

* * * * *